(No Model.)
E. H. BARNES.
AUTOMATIC FEED FOR EDGING SAWS.
No. 345,758. Patented July 20, 1886.
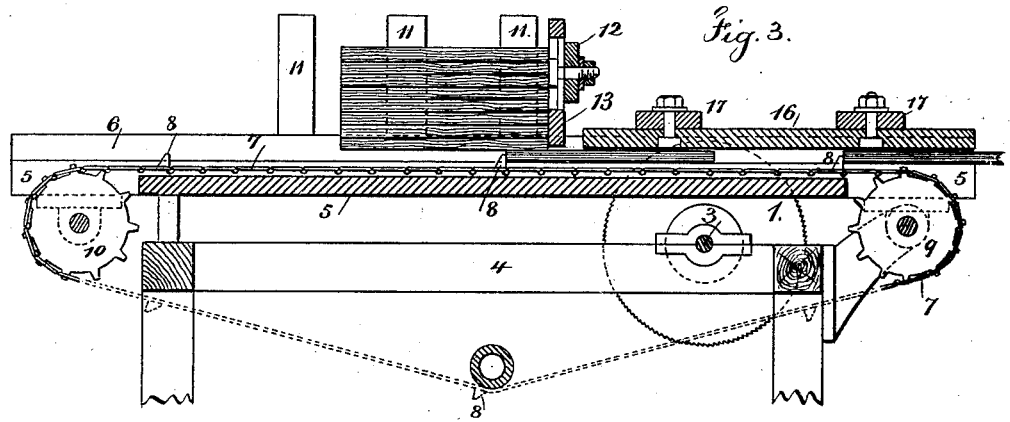
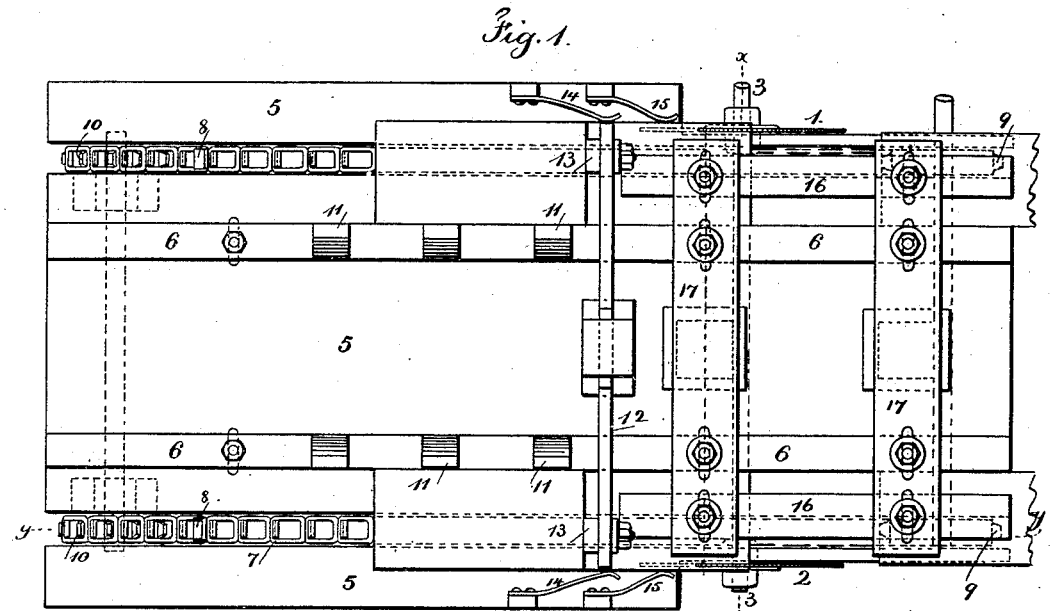
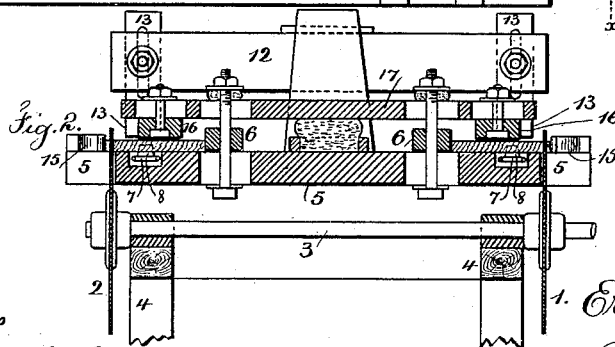
Witnesses
Chas H. Smith
J. Stail
Inventor
Erastus H. Barnes
per Lemuel W. Serrell
atty

UNITED STATES PATENT OFFICE.

ERASTUS H. BARNES, OF BROOKLYN, NEW YORK.

AUTOMATIC FEED FOR EDGING-SAWS.

SPECIFICATION forming part of Letters Patent No. 345,753, dated July 20, 1886.

Application filed March 1, 1886. Serial No. 193,613. (No model.)

*To all whom it may concern:*

Be it known that I, ERASTUS H. BARNES, of Brooklyn, in the county of Kings and State of New York, have invented an Improvement in Automatic Feed for Edging-Saws, of which the following is a specification.

The object of this invention is to feed into a sawing-machine box-lumber to edge the same and render the pieces or sections of uniform width.

This improvement is especially available for preparing the lumber made use of in the manufacture of boxes, and is generally employed for edging the lumber after the same has been sawed into lengths by a machine such as that represented in Letters Patent granted to me February 23, 1886, No. 336,782.

In the drawings, Figure 1 is a plan view of my improvement. Fig. 2 is a cross-section at the line $x$ $x$, Fig. 1; and Fig. 3 is a longitudinal section at the line $y$ $y$, Fig. 1.

The saws 1 2 are upon a mandrel or shaft, 3, supported in a frame, 4, and driven by competent power. The table or bed 5 is attached to the frame 4, near one end, and can be raised and lowered to adjust such bed in its relation to the saw, to accommodate different sizes of saws, as usual. The bed 5 is grooved longitudinally adjacent to the saws, but between the saw and the adjustable fence or gage 6, and within this groove, is the feeding-chain 7, having dogs 8, for carrying along the lumber during the edging operation. The feeding-chain 7 is moved along by a sprocket-wheel, 9, and there is a second sprocket-wheel, 10, which acts as a guide, around which the chain passes. It is preferable to make use of two saws upon the same mandrel, and to employ two feeding-chains in the manner represented, so that only one table will be employed with the two saws. As the feeding devices and gages are the same for both saws, it is only necessary to describe one set of feeding and guiding devices. The fence or gage 6 is clamped upon the surface of the bed 5, and is adjustable transversely to the bed, as usual in sawing-machines, so as to vary the width of the lumber that is edged, and upon this fence or gage 6 there are vertical guide-pieces 11, against which the pile of lumber to be sawed is placed, as seen in Fig. 3, and I make use of a cross-bar, 12, and an adjustable stop, 13, upon the same, at the end of the pile of lumber. The distance between the end of this adjustable stop and the surface of the bed 5 is slightly greater than the thickness of the lumber that is being operated upon, and the height of each dog 8 is slightly less than the thickness of the lumber, in order that such dogs as they are moved along by the feeding-chain may carry out the bottom board in the pile of lumber, and pass the same along to the edging-saw, and I make use of one or more springs, 14 and 15, upon the surface of the bed 5, to press against the edge of the board as it is fed forward, and keep the opposite edge against the fence or gage 6, and thereby render the edging operation uniform and reliable.

It is necessary that the board or lumber be steadied or held down upon the bed until after it has passed entirely by the saw. With this object in view I make use of a steady-bar, 16, running longitudinally over the lumber and above the feeding-chain. This steady-bar is held beneath the arms 17, that are slotted longitudinally, and bolted upon the top of the fence or gage 6. The slots in these arms allow for lateral adjustment both of the fence 6 and steady-bar 16; and such steady-bar 16 can be made either thicker or thinner to allow for the passage of lumber of different thickness beneath such steady-bar, or washers may be introduced between the arms 17 and steady-bar 16 around the connecting-bolts. The sprocket-wheel 9 is near the end of the bed 5; but such bed and the steady-bar 16 extend beyond such sprocket-wheel 9, in order that the dogs 8 may draw away from the ends of the pieces of lumber that have been edged before such lumber passes out from beneath the steady-bar, so that each piece of lumber that has been edged by the saw may project out beyond the bed, but remains stationary until the next piece of edged board passes along and pushes out the previously-edged piece of lumber, the object of this arrangement being to cause the pieces of edged lumber to fall vertically and pile flatwise one upon the other, which would not be the case if the sprocket-wheel and feeding-chain extended beyond the end of the bed. It is to be borne in mind that the distance between one feeding-dog and the next must be greater than the length of the longest pieces of lumber to which the machine is adapted; hence there will be a momentary pause in the sawing operation between one length and the next, but the section that has been edged is pushed out at full speed from beneath the steadying-bar by the next succeeding piece of lumber, and it falls flatwise, as aforesaid.

It will be apparent that in consequence of the bed 5 being above and between the saws the fences 6 are adjacent to each other, and the lumber can be piled by one attendant outside of the respective fences and guide-pieces, and the one cross-bar 12 serves to support the two adjustable stops 13, and the two sprocket-wheels 9 are driven simultaneously for giving motion to the respective feeding chains and dogs, thereby rendering the machine compact, and enabling one attendant to supply the lumber for two saws. This is especially useful in making boxes, because the same number of pieces are required for the tops and bottoms as for the sides of the boxes, and two different widths can be simultaneously edged, thereby facilitating the edging of the proper number of the respective pieces.

I claim as my invention—

1. The combination, with the circular ripping-saw and the bed, of an adjustable fence, 6, parallel with the saw, and having vertical guide-pieces 11, against which the pile of lumber to be edged is placed, the feeding-chain running in a groove longitudinally of the bed and lengthwise of the lumber to be edged, the dogs and sprocket-wheels for the same, the cross-bar 12, and vertical adjustable stop 13 at the ends of the lumber to be edged, and springs to act against the edge of the piece of lumber resting on the bed, substantially as set forth.

2. The combination, with the circular saw and bed, of the feeding chain, dogs, and sprocket-wheels, the adjustable fence or gage parallel with the saw, the steady-bar beneath which the piece of lumber to be edged is passed and the arms passing across the fence and supporting the steady-bar, substantially as set forth.

3. The combination, with the circular saw and the bed grooved longitudinally, of the feeding-chain running in such groove, the dogs and sprocket-wheels for the same, the cross-bar and adjustable stop for holding the pile of lumber while the bottom board is carried away by the feeding-chain, the steady-bar and arms for holding the same, the said steady-bar and bed projecting beyond the sprocket-wheel and chain, for the purposes and substantially as set forth.

4. The combination, in an edging-machine, of two circular saws, a mandrel for the same, a bed above the mandrel and between the edging-saws, adjustable fences upon the said bed between and parallel with the saws, a cross-bar above the fence, and two adjustable stops upon the same at the ends of the piles of lumber upon the bed, feeding-chains passing lengthwise of the bed, and dogs and sprocket-wheels for the same, steady-bars above the feeding-chains and adjustable arms for supporting the steady-bars, substantially as set forth.

Signed by me this 5th of February, A. D. 1886.

ERASTUS H. BARNES.

Witnesses:
GEO. T. PINCKNEY,
WILLIAM G. MOTT.